US011893673B2

(12) United States Patent
Wu et al.

(10) Patent No.: US 11,893,673 B2
(45) Date of Patent: Feb. 6, 2024

(54) MORPH TARGET ANIMATION

(71) Applicant: SOUL MACHINES LIMITED, Auckland (NZ)

(72) Inventors: Tim Wu, Auckland (NZ); Pavel Sumetc, Auckland (NZ); David Bullivant, Levin (NZ)

(*) Notice: Subject to any disclaimer, the term of this patent is extended or adjusted under 35 U.S.C. 154(b) by 225 days.

(21) Appl. No.: 17/287,254

(22) PCT Filed: Oct. 31, 2019

(86) PCT No.: PCT/IB2019/059327
§ 371 (c)(1),
(2) Date: Apr. 21, 2021

(87) PCT Pub. No.: WO2020/089817
PCT Pub. Date: May 7, 2020

(65) Prior Publication Data
US 2023/0117787 A1    Apr. 20, 2023

(30) Foreign Application Priority Data
Oct. 31, 2018   (NZ) .................................... 747627

(51) Int. Cl.
*G06T 13/40* (2011.01)
*G06T 19/20* (2011.01)
*G06T 7/155* (2017.01)
*G06T 15/08* (2011.01)

(52) U.S. Cl.
CPC .............. *G06T 13/40* (2013.01); *G06T 19/20* (2013.01); *G06T 7/155* (2017.01); *G06T 15/08* (2013.01); *G06T 2210/44* (2013.01); *G06T 2219/2021* (2013.01)

(58) Field of Classification Search
CPC ..... G06T 13/40; G06T 19/20; G06T 2210/44; G06T 2219/2021; G06T 7/155; G06T 15/08
See application file for complete search history.

(56) References Cited

U.S. PATENT DOCUMENTS

| 7,292,250 | B2* | 11/2007 | Sepulveda ............... G06T 13/40 345/473 |
| 7,843,456 | B2 | 11/2010 | Xu et al. |
| 8,749,543 | B2 | 6/2014 | Huang et al. |
| 9,202,300 | B2 | 12/2015 | Saito |
| 9,256,973 | B2 | 2/2016 | Koperwas et al. |

(Continued)

FOREIGN PATENT DOCUMENTS

| KR | 101775836 B1 | 9/2017 |
| WO | 2016207311 A1 | 12/2016 |

OTHER PUBLICATIONS

Lian, et al, "A Pattern Approximation Method for Distorted Reflector Antennas Using Piecewise Linear Fitting of the Exponential Error Term", 2015, IEEE (Year: 2015).*

(Continued)

*Primary Examiner* — YuJang Tswei
(74) *Attorney, Agent, or Firm* — RC Trademark Company

(57) ABSTRACT

A computer graphics animation system is provided to assist prevent the generation of undesirable shapes, by providing realistic examples of a subject which are incorporated into an interpolation function which can be used to animate a new shape deformation of the subject.

21 Claims, 9 Drawing Sheets

(56) References Cited

U.S. PATENT DOCUMENTS

| | | | | |
|---|---|---|---|---|
| 9,449,417 | B1* | 9/2016 | Iben | G06T 13/40 |
| 2004/0095344 | A1 | 5/2004 | Dojyun et al. | |
| 2009/0238404 | A1* | 9/2009 | Orderud | G06T 7/149 |
| | | | | 382/103 |
| 2011/0002532 | A1* | 1/2011 | Frakes | G06T 7/11 |
| | | | | 382/154 |
| 2011/0018880 | A1* | 1/2011 | Whited | G06T 11/203 |
| | | | | 345/473 |
| 2011/0050692 | A1* | 3/2011 | Zhang | G06T 3/0093 |
| | | | | 345/424 |
| 2014/0064588 | A1 | 3/2014 | Su et al. | |
| 2017/0243387 | A1 | 8/2017 | Li et al. | |
| 2018/0033190 | A1* | 2/2018 | Ma | G06T 13/40 |
| 2018/0130256 | A1* | 5/2018 | Wampler | G06T 13/20 |
| 2018/0197322 | A1* | 7/2018 | Sagar | G06T 7/251 |
| 2019/0139277 | A1* | 5/2019 | Chen | G06F 3/03545 |

OTHER PUBLICATIONS

Anderson et, al., "Low-Cost, Meaningful, Nondeterministic Design", 2012, ASME (Year: 2012).*

Jing et al., "Wide-range weight functions and stress intensity factors for arbitrarily shaped crack geometries using complex Taylor series expansion method", 2015, Elsevier Ltd. (Year: 2015).*

Noh et al., "A Survey of Facial Modeling and Animation Techniques", 1998, USC (Year: 1998).*

International Search Report mailed in International Patent Application PCT/IB2019/059327 dated Mar. 3, 2020, 3 pages.

International Preliminary Report on Patentability issued in International Patent Application PCT/IB2019/059327 dated Apr. 27, 2021, 7 pages.

* cited by examiner

A

B

C

D

A

B

A

B

C

D

MORPH TARGET ANIMATION

TECHNICAL FIELD

The invention/s relate to image data processing/generation/animation. More particularly but not exclusively, the invention/s relate to morph target animation.

BACKGROUND ART

The movement of a computer graphics character is controlled by the animator using a set of control parameters. Given these parameters, the animation software calculates the shape of the character. Since a computer graphics character is represented as a collection of vertices forming a mesh, this problem is sometimes referred to as the mesh deformation problem. The main challenge of this problem is to create a technology which allows animating using control parameters while keeping produced shapes usable and desirable.

Physically-based deformation approaches produce the character's shape using physical simulations, typically involving the underlying muscles or bone movement mechanics. In this case mesh deformation using control parameters is subjected to mechanics laws which constrain character deformation to usable and realistic shapes. Physically-based simulation requires knowledge of mechanics in addition to advanced numerical methods which are computationally expensive. In addition, many computer graphics characters are fantasy characters (aliens, dragons, etc.) and achieving a particular desired deformation with physical simulation might require many trial-and-error iterations.

Examples-based methods involve the creation of various character poses which are used in animation as reference states. These example shapes allow specifying the desired character deformation, whereas physical simulation is an indirect process, namely, any character shape deformation can be calculated from the movement mechanics. Linear blendshape examples-base models are widely used in animation (e.g. Lewis, J. P., Anjyo, K., Rhee, T., Zhang, M., Pighin, F. H., & Deng, Z. (2014). *Practice and Theory of Blendshape Facial Models. Eurographics (State of the Art Reports)*, 1(8)). Traditional approaches include morph target shapes which are blended in a linear way, however linear blending often does not reproduce the nonlinear soft tissue deformation as well as the nonlinear interaction of different tissue types and anatomical structures. To avoid this, algorithmic constraints on weight magnitudes are sometimes introduced using constraining algorithms.

OBJECTS OF THE INVENTION

It is an object of the present invention to improve morph target animation or to at least provide the public or industry with a useful choice.

SUMMARY

According to one embodiment: An animation system for generating a weighted interpolation between two or more Morph Target Shapes, the animation system comprising: input means to receive a set of input weightings on Morph Target Shapes for the weighted interpolation to be generated; a multi-variate continuous Interpolation Function, wherein given a set of shapes including Morph Target Shapes and Constraint Shapes representing weighted combinations of Morph Target Shapes, the Interpolation Function is configured to reproduce Morph Target Shapes and Constraint Shapes when corresponding weights are provided as input weightings on Morph Target Shapes to the multi-variate continuous function; and means for generating the weighted interpolation by using the input weightings as arguments to the multi-variate continuous interpolation function.

According to another embodiment: A method for generating a weighted interpolation between two or more Morph Target Shapes relative to a Base Shape, the Morph Target Shapes each including a plurality of topologically consistent vertex coordinates, including the steps of: receiving a plurality of Input Constraint Shapes including a plurality vertex coordinates topologically consistent with those of the Morph Target Shapes, each Input Constraint Shape associated with non-zero weights on one or more of the Morph Target Shapes; generating Additional Constraint Shapes for a plurality of new weightings on Morph Target Shapes using the Input Constraint Shapes, and associating the Additional Constraint Shapes with their respective new weightings; receiving interpolation weightings for each of the two or more Morph Target Shapes; generating an Interpolation Function for interpolating between the two or more Morph Target Shapes using the Base Shape, Input Constraint Shapes and Additional Constraint Shapes; using interpolation weightings as arguments to the Interpolation Function to generate vertex coordinates corresponding to the weighted interpolation between the two or more Morph Target Shapes.

According to another embodiment: A method for generating a weighted interpolation between a plurality n of Morph Target Shapes $B_1 \ldots B_n$ relative to a Base Shape $B_0$ including the steps of: receiving a set of weights W, including for each Morph Target Shape $B_k$ of the Morph Target Shapes $B_1 \ldots B_n$, a weight $w_k$ to be applied to that Morph Target Shape $B_k$; receiving a plurality m of Constraint Shapes $C_1 \ldots C_m$, each Constraint Shape associated with non-zero weights (associated weights) on one or more of the Morph Target Shapes $B_1 \ldots B_n$ (associated shapes); generating a continuous multivariate Interpolation Function configured to reproduce each Morph Target Shape and each Constraint Shape when a respective Morph Target Shape or a Constraint Shape's associated weights on associated shapes are provided as arguments to the Interpolation Function; and using the weights W to be applied to Morph Target Shapes as arguments of the Interpolation Function to generate the weighted interpolation.

According to another embodiment: A method for estimating underlying Component Shape weights of a Complex Shape including the steps of: receiving one or more suggested Component Shapes; and obtaining Component Shape weights through solving least square problem where penalties and Solution Boundaries are enforced to ensure the weights associated with suggested Component Shapes are nonzero.

A method for generating a weighted interpolation between two or more Control Shapes, at least one of the Control Shapes being a Complex Shape comprising a weighted combination of a plurality of Component Shape, including the steps of: mapping the Control Shapes into their constituent Component Shapes and associated weightings on each of the constituent Component Shapes to form a set of weighted target Component Shapes; providing the set of weighted target Component Shapes to an Interpolator; using the Interpolator to interpolate between the set of weighted target Component Shapes to generate the weighted interpolation between the two or more Control Shapes.

DISCLOSURE

Morph Target Shape Interpolation

In morph target animation, Morph Target Shapes are also known as blendshapes, blend shapes, basis shapes, blendshape targets, or morph targets, and represent a "deformed" version of a Base Shape (or reference shape) which may be stored as a set of vertex coordinates (or positions). The deformation of Base Shapes using Morph Target Shapes can be controlled by an animator using a set of control parameters. Given these control parameters, a Morph Target Animation Model calculates the shape of the deformation. A key challenge in computer graphics and animation technology is to enable animating under control parameters while keeping produced shapes usable and desirable.

Figure 10:
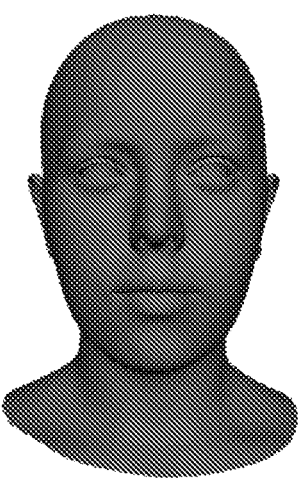
FIG. 10 shows a plurality of Morph Target Shapes.
Figure 10:
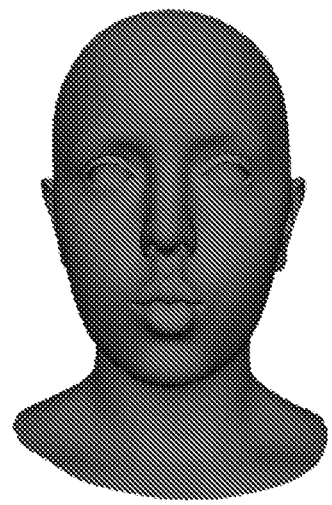
Figure 10:
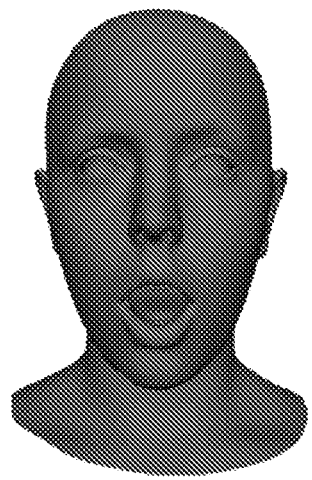
Figure 10:
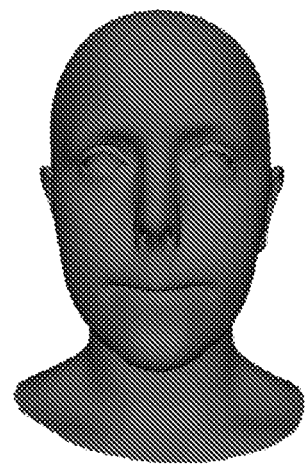

A Morph Target Animation Model may include several Morph Target Shapes, each comprising a distinct geometric shape. Morph Target Shapes may, for example, be represented by a topologically consistent set of vertex coordinates (geometric positions, or points), allowing an animator to deform a Base Shape using the one or more of the Morph Target Shapes to create a new shape. In facial animation, traditional Morph Target Animation Models/Morph Target Shape interpolators generate a facial pose as a linear combination of a number of facial expressions, the Morph Target Shapes ("targets"). FIG. 10 shows an example of four Morph Target Shapes representing Facial Action Coding System (FACS) shapes, a "cheek raiser" A (AU06), "lip pucker" B (AU18), "Jaw opener" C (AU26) and "Lip suck" D (AU28).

Figure 1:
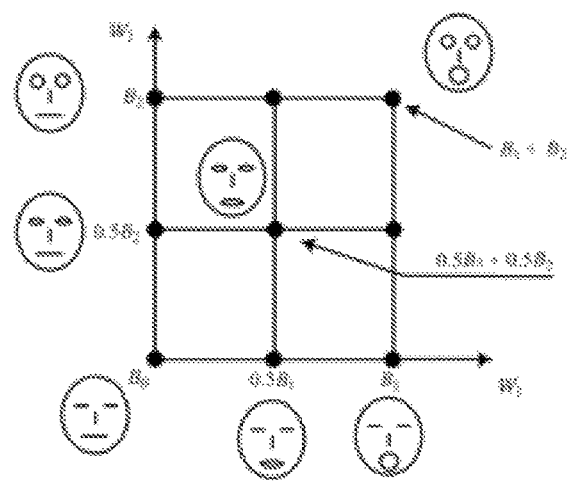
FIG. 1 shows a schematic representation of a linear morph target shape example-based model.

FIG. 1 shows a schematic representation of a linear example-based Morph Target Animation Model. The shown linear Morph Target Animation Model for a human face includes three provided shapes, namely $B_0$, $B_1$ and $B_2$. Using only these three examples, the Morph Target Animation Model enables generating various blended expressions by linearly combining given example expression shape. The base shape $B_0$ represents a neutral or resting state of the face. Morph Target Shape $B_1$ represents a deformation whereby the face has an open jaw, and $B_2$ represents the face deformed such that the eyes are open. Interpolation (also referred to as blending, or morphing) refers to interpolating between a plurality of shapes in some manner.

FIG. 1 shows an interpolation halfway between $B_0$ and $B_1$, as $0.5B_1$, which can be described as a half-open jaw (obtained by multiplying $B_1$ by a factor of 0.5), and an interpolation halfway between $B_0$ and $B_2$, as $0.5B_2$, which can be described as a half-open eyes (obtained by multiplying $B_2$ by factor of 0.5).

Figure 8:
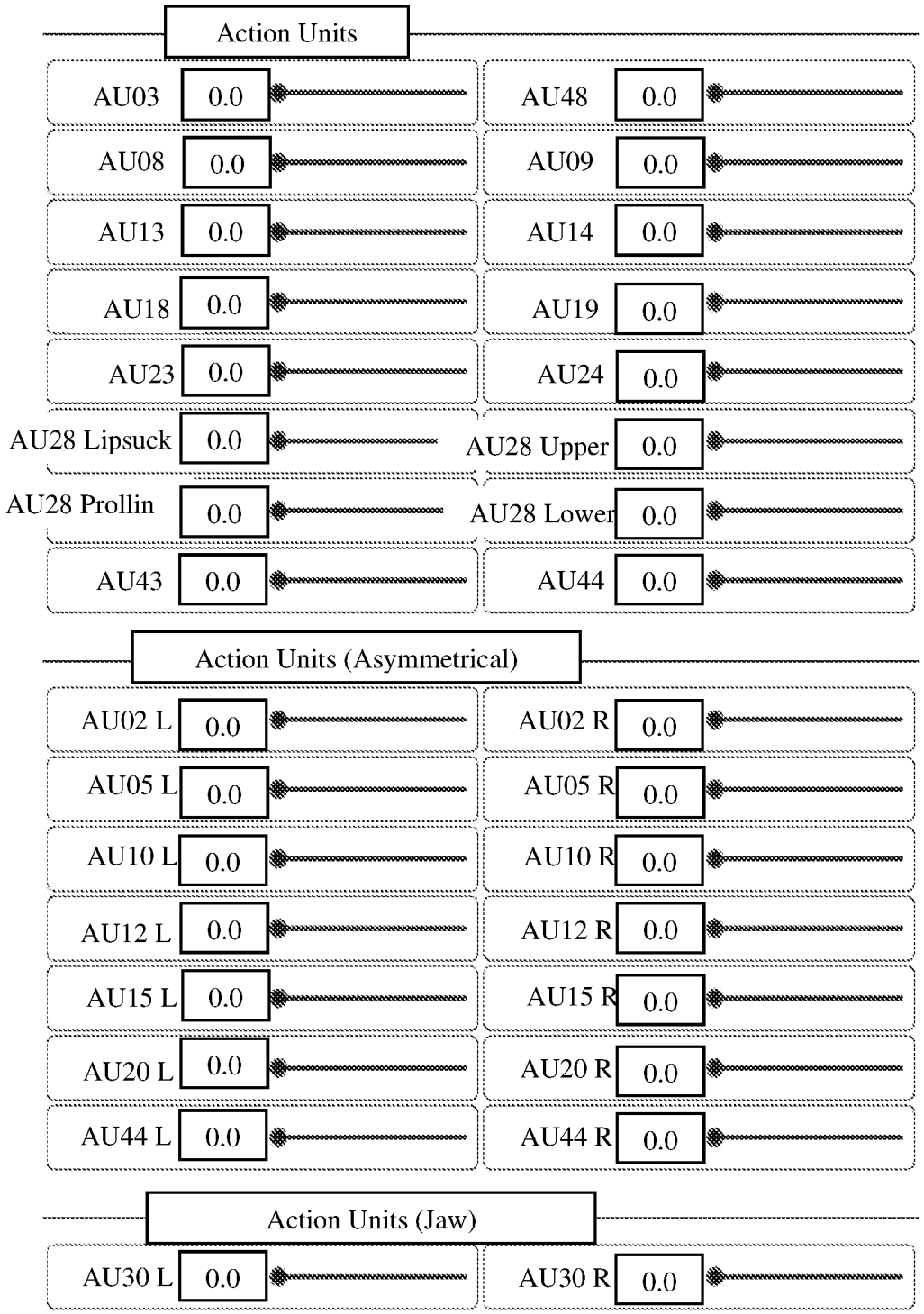
FIG. 8 shows a screenshot of a user interface for controlling Morph Target Shape weights.
Figure 9:
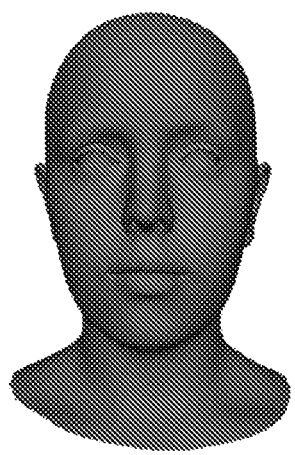
FIG. 9 shows a Base Shape.

Weightings can be applied to Morph Target Shapes to create Incremental Shapes (intermediate shapes between the Base Shape and a Morph Target Shape, sometimes referred to as "in-between" shapes). Weights applied to individual Morph Target Shapes may be set on a user interface using sliders, as shown in FIG. 8. In this specification, a shape which has a weighting w: 0<w<1, on a single morph target shape i,s referred to as an Incremental Shape.

Morph Target Animation Models may also be used to animate a combination of multiple Morph Target Shapes with unity weights: w=1. For example, $B_1+B_2$ shows a combination of $B_1$ and $B_2$ Any shape which is a combination of two or more Morph Target Shapes with unity weights is referred to as a Combination Shape.

Combination-Incremental Shapes are shapes which are a combination of two or more Morph Target Shapes whereby at least one of the Morph Target Shapes forming the combination is weighted (i.e. has a non-unity weight). In FIG. 1, $0.5B_1+0.5B_2$ shows a Combination-Incremental Shape which is a combination of $B_1$ with a 50% weighting and $B_2$ with a 50% weighting. Thus, the Morph Target Animation Model shown in FIG. 1 provides a theoretically infinite set of possible expressions by different linear combinations of $B_1$ and $B_2$. A linear Morph Target Animation Model may include any number of Morph Target Shapes $B_k$ which are blended in a linear manner using the formula: $f=B_0+\Sigma_{k=1}^{K}(w_k \Delta B_k)$, where $B_0$ represents the shape's vertices at resting geometry (the Base Shape), $\Delta B_k$ is a vector representing the displacement of the $k^{th}$ Morph Target Shape with respect to the Base Shape ($\Delta B_k=B_k-B_0$), $W_k$ is the corresponding weight applied to the basis shape $B_k$, and $f$ is the resulting shape. Here the term "linear" refers to linear dependency of the resulting shape $f$ upon basis weights $w_k$.

Morph target animation provides animators with an intuitive understanding of how shapes can be incremented and combined. However, there are several problems with using a simple linear model such as described above with reference to FIG. 1.

Firstly, shape interpolations could produce unusable motions, when the subjects being modelled do not deform in a linear manner. This poses a particular problem when modelling biology. For example when modelling a human face, a linear formula cannot reproduce the nonlinear soft tissue deformation which occurs in the real-world. However, if facial expressions are modelled by a linear Morph Target Animation Model, facial expressions are linearized by assuming a linear relationship between blending weights and deformed face geometry, which results in unrealistic animations.

Figure 2:
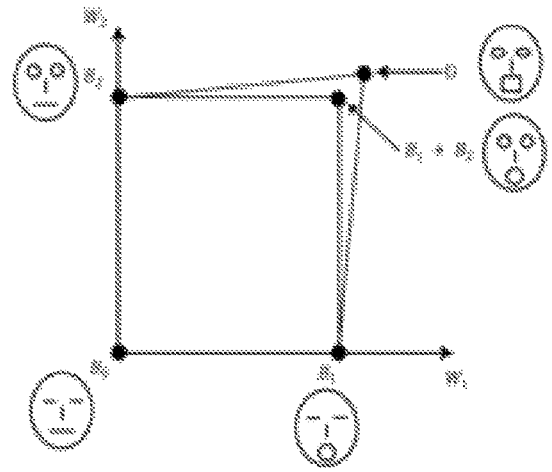
FIG. 2 shows a schematic representation of how a linear morph target shape example-based model may produce an undesired shape.

Secondly, the simple linear model of FIG. 1 fails to represent the nonlinear interaction of different tissue types and anatomical structures. FIG. 2 shows an example where an animator wants to obtain expression D as a more realistic representation of the combination between $B_1$ and $B_2$. For the purpose of this illustration it is assumed that biology of the human face is such that when opening the eyes and the jaw at the same time, the eyes are not able to open as far as they would if the jaw were not also open, and the opening of the eyes along with the jaw makes the jaw open in a slightly different way (represented as a square rather than an oval). Using a simple linear formula would produce $B_1+B_2$, however the result such modelling is not usable since the user desires to obtain an expression, D. In other words, combinations of Morph Target Shapes are not necessarily the sum of appearance changes of individual Morph Target Shapes: in fact, some combinations may create distinctively different changes in appearance. When creating a Morph Target Animation Model based on FACS units as Morph Target Shapes it may be possible for modelers to tweak individual Action Unit (AU) Shapes such that combinations between the Morph Target Shapes look more acceptable, however this may be at the cost of the expressiveness of the individual AUs.

Unusable shapes could result from combination of many shapes, because multiple shapes deformations may share the same vertices and blending these shapes leads to superposition of the vertex displacement and, as a result, unpredictable blended/interpolated shape. To avoid this, constrains on weights magnitude may be introduced. Some methods to apply constraints on basis weights may be applied, for example, applying the constraints $\Sigma_{k=1}^{n} w_k=1$ guarantees that the morph target model lies within the convex hull of the morph targets.

Figure 3:
FIG. 3 shows a schematic example of applying a convex hull constraint to a Morph Target Shape.

Methods with constraints on weights are problematic as weights cannot be modelled independently without violating the constraint. In addition, the constraint equation above will only ensure the resulting shape lies within the convex hull but does not guarantee the deformation to be realistic. In practice, this constraint prevents breakage by reducing the magnitude of the blended vertex displacements. For example, as shown in FIG. 3, applying convex hull constraint to a basis may mean that a combination between Morph Target Shape 601 and 602 may look as shown in 603, whereas the desired result is shown in 604.

Another method of defining weights leading to usable Morph Target Shapes is to solve a least square problem, such as min $\|\Sigma_{k=1}(W_k-\alpha_k) \Delta B_k\|n+\mu\|\alpha_k\|$, where $\alpha_k$ are the new weights to be solved and $\mu$ is the regularization parameter. The drawback of this approach is choosing parameter $\mu$ to obtain usable Morph Target Shapes. In addition, this approach requires the system to solve a minimization problem every time $w_k$ is updated, and is therefore computationally expensive.

Another approach includes altering specified Morph Target Shapes according to some heuristic algorithm to constrain the model to usable resulting Morph Target Shape. As a result, the morph target model becomes nonlinear having the form: $f=B_0+\Sigma_{k=1}^{n}(w_k) \Delta B_k$, where new weights $\alpha_k=h(w_k)$ are the functions of basis weights. The key feature here is devising the function h. This often involves wide range of experimenting and expert knowledge.

The approaches described above introduce algorithmically based constraints. In other words, constraining algorithms are introduced in a way that alters basis weight by applying this algorithm across entire model parameters. However, in practice this means that the blending weights cannot be modeled independently without violating the constraint.

For example, in some particular case, a user could specify $w_1=1$ and $w_2=1$ expecting blend shape $f=B_0+\Delta B_1+\Delta B_2$ but an animation system after applying constraints could recalculate $w_2$ so that $w_2=\alpha\neq1$, and $f=B_0+\Delta B_1+\alpha\Delta B_2$ which leads to undesired result from the user side (in other words, the produced shape $f$ is not what the user expected by specifying weights).

This leads to technical problems including how to computationally combine Morph Target Shapes in a realistic and predictable way, taking into account the non-linearity of some Morph Target Shape interpolations and/or combinations between Morph Target Shapes. It is computationally expensive to compute an interpolation between many Morph Target Shapes and methods such as Radial Basis Function (RBF) interpolation would be very slow on a large number of Morph Target Shapes (dimensions).

Detailed Description & Embodiments the Invention

A Morph Target Animation Model allows Morph Target Shapes to be incremented and combined in a realistic, consistent, and easy to control manner. Constraint Shapes are provided to create an Interpolation Function which is used for interpolation between a Base Shape and a plurality of Morph Target Shapes. Constraint Shapes are realistic examples of combinations and/or increments of Morph Target Shapes, mapped to the weightings on each of the individual Morph Target Shapes that they represent. Incorporation of the Constraint Shapes into the non-linear interpolation function helps prevent undesirable shapes from being generated. This can be thought of as devising a multi-variate continuous function which "passes through" Constraint Shapes. The Interpolation Function can be used to produce any desirable pose which is a combination of Morph Target Shapes under user control by applying weights to the Morph Target Shapes.

Additional Constraint Shapes representing new weights may be automatically calculated in a non-linear manner using the Morph Target Shapes and Input Constraint Shapes. The resulting interpolated pose is then a combination of all relevant Morph Target Shapes, taking into account real-world non-linear influences via Constraint Shapes (both Input Constraint Shapes and Additional Constraint Shapes). Nonlinearity is introduced during the pre-computation stage, while actual interpolation of vertices is linear. This allows fast and real-time interpolation.

All shapes (Morph Target Shapes and Constraint Shapes) are accounted for in an Morph Target Animation Model through an Interpolation Function. The Interpolation Function is configured to reproduce Morph Target Shapes and Constraint Shapes when corresponding weights are provided. Given a set of all shapes S (including both Morph Target Shapes and Constraint Shapes), the interpolation function $f(W)$ is generated such that $f(W)=S$, where W is the set of all given interpolation weights.

Rather than extending the dimensionality of the Morph Target Shape space (the number of Morph Target Shapes in the model), the shape space is modeled as a nonlinear contribution to the Morph Target Shape model. That is, the number of Morph Target Shapes required by the model can be reduced, for example, by incorporating mixtures of units instead of requiring new units. This can be achieved by using a high dimensional model representation (HDMR), which takes advantage of a mathematical expression of nonlinear combinations. In other words, the Shape space can be modeled as a combination of nonlinear contributions to the Morph Target Animation Model.

Figure 7:
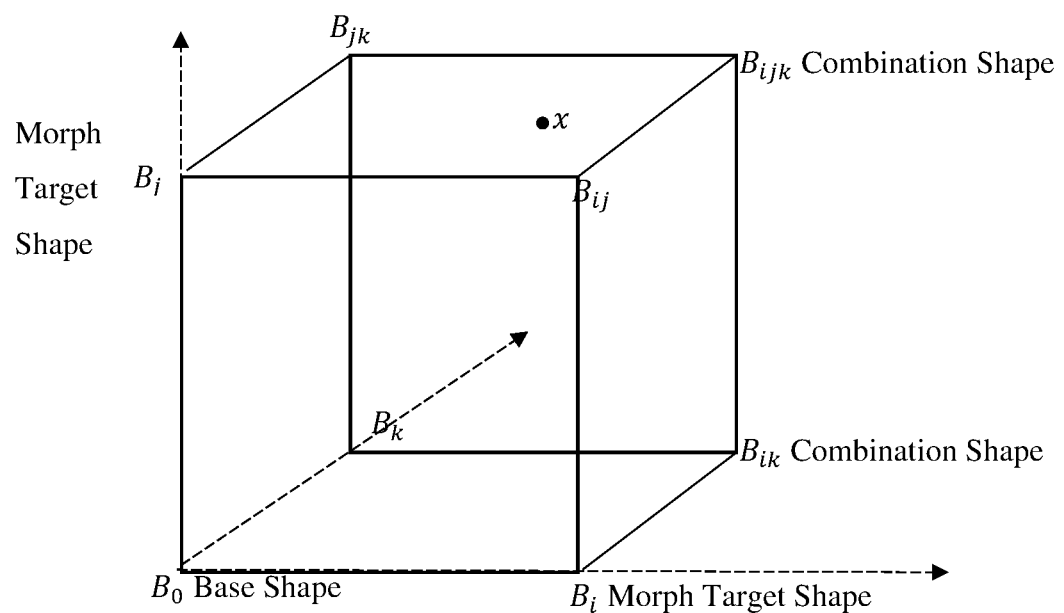
FIG. 7 shows a three-dimensional hypercube model.

A plurality of Morph Target Shapes n may be considered as vertices an n-dimensional cube, forming an expression space or deformation space. Each dimension is associated with a Morph Target Shape, and the Base Shape is at the origin of the expression space. The hypercube edges represent weights on the corresponding Morph Target Shapes. FIG. 7 shows a 3-dimensional cube. The origin $B_0$ represents the Base Shape and is connected to three Morph Target Shapes $B_i$, $B_j$, and $B_k$. $B_{jk}$, $B_{ik}$, and $B_0$ are Combination shapes, for example, $B_{ik}$ represents a combination of $B_j$ and $B_k$. $B_{ij}$ is a combination shape combining three Morph Target Shapes $B_i$, $B_j$, and $B_k$. A Shape x is a combination of $B_k$ with unitary weighting (1), $B_i$ with a weighting of 0.5, and $B_j$ with a weighting of 0.8.

The Interpolation Function is configured over an n-dimensional cube, passing through Constraint Shapes situated at points on the n-dimensional cube. In one embodiment, the Interpolation Function may have the form:

$$f(W) = B_0 + \sum_{k=1}^{n}(w_k \Delta B_k) + \sum_{i=1}^{m}(\beta_i \Delta C_i)$$

wherein $B_0$ is the Base Shape (resting geometry), $\Delta B_k$ is the $k^{th}$ Morph Target Shape deformation relative to the base shape $B_0$, $w_k$ is the corresponding Morph Target Shape weight to be interpolated. Thus, the first part of the equation is simply a linear combination of Morph Target Shape weights. $\Delta C_i$ is the $i^{th}$ constraint shape deformation relative to any lower-dimensional shape accounted for in the non-linear interpolation function, including the base shape. In other words, $\Delta C_i$ is the difference between the $i^{th}$ constraint shape and the shape produced by the previous layer of interpolation. $\beta_i$ is a corresponding Modifier (akin to a coefficient, modifier term or constraint weight) applied to $\Delta C_1$, calculated such that the Interpolation Function meets the criteria $f(W)=S$.

Thus the term $\Sigma_{i=1}^{n}(w_k \Delta B_k)$ sums the displacement contribution of all Morph Target Shapes and the term $\Sigma_{i=1}^{m}(\beta_i \Delta C_i)$ sums the displacement contribution of all Constraint Shape, including Constraint Shapes which are Incremental Shapes based on single Morph Target Shapes, Combination Shapes, and Combination-Incremental Shapes.

To generate the Interpolation Function, a set of Morph Target Shapes $B_{1...n}$ and a set of Constraint Shape and $C_{1...n}$ corresponding to the subject being modeled are provided, with each of the Constraint Shape $C_{1...n}$ being associated with metadata corresponding to its constituent Morph Target Shape/s and which weighting/s on those Morph Target Shape/s the Constraint Shape represents.

Figure 14:
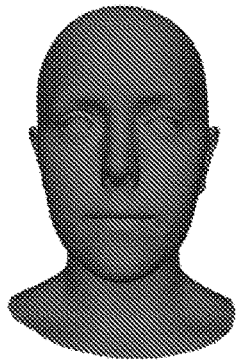
FIG. 14 shows a Constraint Shape which is an Incremental Shape.
Figure 15:
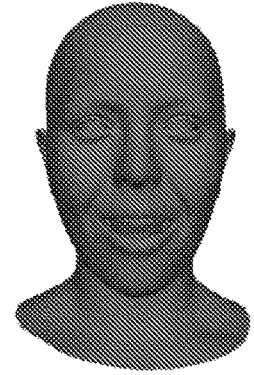
FIG. 15 shows a Constraint Shape which is a Combination-Incremental Shape.

For example, in FIG. 2 the shape D is a Constraint Shape which is a Combination Shape corresponding to the weight combination $w_1=1$, $w_2=1$. FIG. 14 is a Constraint Shape which is an Incremental Shape which corresponds to a weighting of 0.5 on the Morph Target Shapes depicting a lip suck (AU28), shown in FIG. 10D. FIG. 15 is a Constraint Shape which is a Combination-Incremental Shape and corresponding to a weighted combination of 100% of the Morph Target Shape AU06 (cheekraiser), 80% of the Morph Target Shape AU12 (lip corner puller), and 60% of the Morph Target Shape AU26 (jaw opener). Thus, if the Shape of FIG. 15 is incorporated into the nonlinear interpolation function, then inputting W={100% AU06, 80% AU12, 60% AU26} would output an interpolated shape identical to the shape of FIG. 15. If an interpolation of W={90% AU06, 80% AU12, 60% AU26} were desired instead (which has not been provided as a Constraint Shape), the Interpolation Function would output a new interpolated shape, taking into account the information provided by relevant Constraint Shapes, including the Constraint Shape of FIG. 15 with more nuanced cheek-raising relative to that of the Constraint Shape of FIG. 15.

In summary, the nonlinear Interpolator generates deformations $\Delta B_k$ and $\Delta C_1$, and Modifier $\beta_i$ for the given interpolations weightings $w_1 \ldots w_n$ such that for all shapes S, being comprised of the system, the nonlinear Interpolation Function holds, i.e. $f(W)=S$. For example, if a Constraint Shape $C_u$ is introduced into the nonlinear function, corresponding to Morph Target Shapes $B_1$ and $B_2$ with $w_1=1$, $w_2=1$, $\beta_u$, the Modifier applied to the constraint shape $C_u$ in the nonlinear interpolation equation is calculated to meet the constraint criteria: $B_0+\Delta B_1+\Delta B_2+\beta_u \Delta C_u=C_u$. In this manner, desired resulting shapes are always reproducible through introducing further Constraint Shapes.

To use the nonlinear Interpolation Function, the set of interpolation weightings W i.e. interpolation weightings W for each of the Morph Target Shapes to be interpolated are received ($w_1 \ldots _n$) as input to the nonlinear Interpolation Function, to output the interpolated shape.

The set of weights $w_1 \ldots w_n$ ($0<w_k<1$) may be prespecified, in some manner. For example, an animator specify interpolation weightings for each morph target shape via sliders, as shown FIG. 8. In other embodiments, interpolation weightings may be automatically provided via an animation system to animate key frames, may be randomly generated, or specified in some other manner.

Morph Target Shapes and/or Constraint Shapes may be created in any suitable manner, including scanned data from real subjects, artist modifications, or physically simulated data, or a combination of methods.

The interpolation method/s can be applied to any deformable geometry controls that are based on Morph Target Shapes/blendshapes or shape primitives. Morph Target Shapes may represent any deformable subjects, such as machines, bodies, or components of bodies. Examples include but are not limited to human or animal bodies, faces, hands, limbs, or non-human characters such as fantastical creatures and characters. Implementations of the invention are described with reference to Morph Target Shapes which represent faces, particularly human faces.

In other embodiments, the method/s may be used for blending facial identities or anatomical variations. Rather than blending expressions of the same subject, the system can be used to blend subjects with different identities or anatomical variations between subjects. For example, an artist may create a representation of a cat's face, a dog's face, and a representation of what they think a cross breed of a dog and a cat looks like as a Combination Shape and using this, and any other Constraint Shapes provided by the artist, the interpolation system may be used to create weighted blends between a dog and a cat face.

Morph Target Shapes may represent faces with certain expressions, or micro expressions. The human face can form an almost unlimited number of expressions, which are the result of contracting one or more facial muscles to varying degrees. Complex facial expressions or movements can be "decomposited" into basic movements, such as the movements defined by the Facial Action Coding System (FACS)

taxonomy. FACS taxonomizes human facial movements by their appearance on the face. A facial expression can be coded using FACS by deconstructing it into a set of specific action units (AU). FACS thus provides a reliable and precise way to describe facial changes by particular muscle actions. Complex Shapes such as facial expressions portraying certain emotional expressions or visemes may be described in terms of a set of weighted AUs. In other embodiments, Morph Target Shapes may represent visemes, which are generic facial images that correspond to a particular sound, which can be thought of as the visual equivalent of a phoneme or unit of sound in spoken language.

A Shape could be a mesh or any other point or set of points in a multidimensional space. For example, a shape may be defined as a collection of vertices (points) that represent a state of geometry. Collections of points for each shape are topologically consistent to each other. Shape input may be represented as a matrix of vertices along metadata such as the shape's name and category or categories (whether it is a Morph Target Shape, Base Shape, Constraint Shape, Combination Shape etc). In some embodiments, a suitable geometry definition file format may be used to input shape vertices, such as the 3D model format OBJ (.OBJ) file format. A naming convention for naming Shape files may be used to provide metadata about the Shapes. One example of a possible naming convention may be: Name1_weight1_Name2_weight2 . . . , where weight$_i$=w$_i$ is a number so that 0<w$_i$≤1. The weight may be omitted if w$_i$=1. A Shape with all w$_i$=0 is a Base Shape (or reference shape) and it could be named arbitrarily. The Interpolator may output an interpolated Shape, which may be represented as a matrix or in any other suitable manner.

Figure 4:
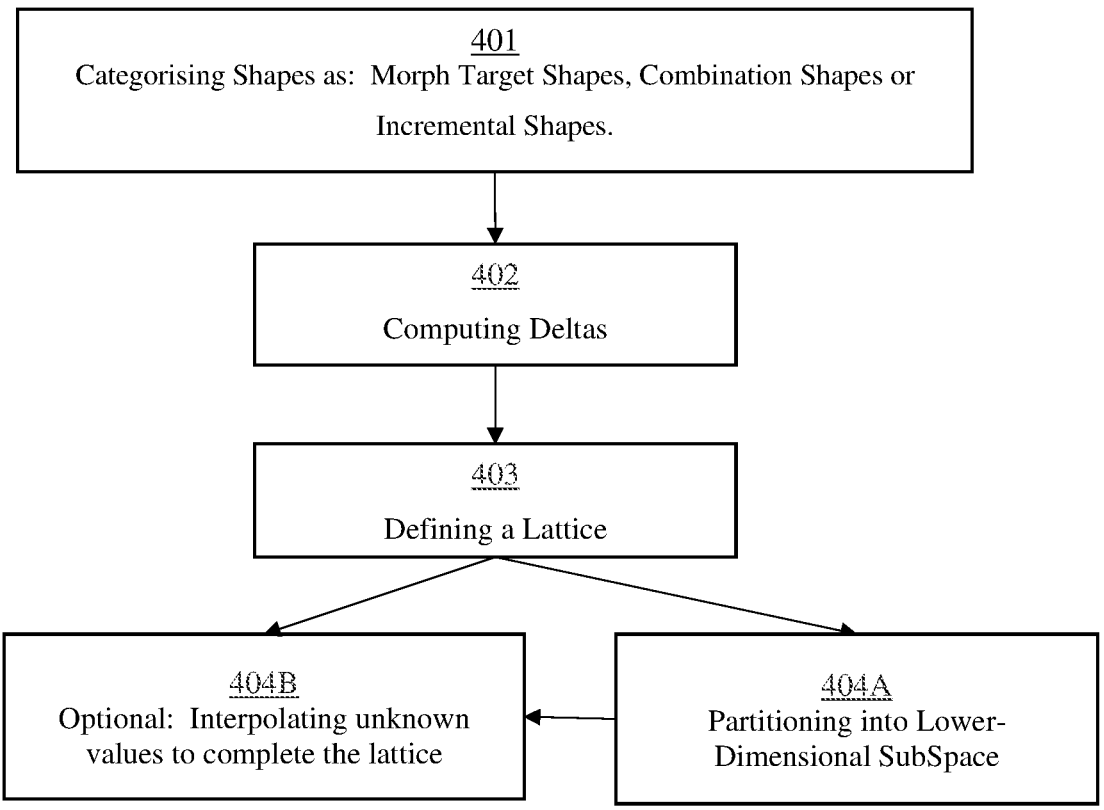
FIG. 4 shows a flow diagram of a method of precomputing a nonlinear interpolation function according to one embodiment.
Figure 5:
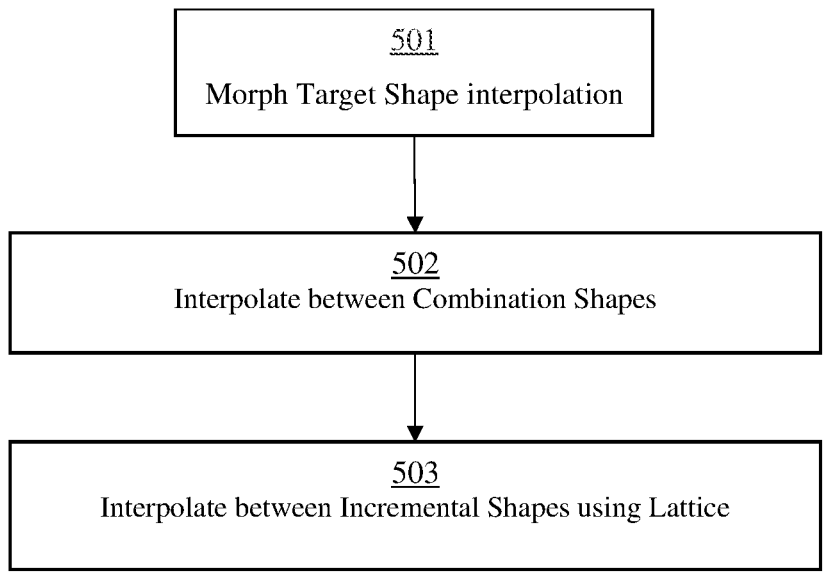
FIG. 5 shows a flow diagram of a method of interpolation according to one embodiment.

Computation of the Nonlinear Interpolation Function:

FIG. 4 shows a flow diagram of precomputing a nonlinear Interpolation Function according to one embodiment. At step 401, shapes are categorized as Morph Target Shapes, Incremental Shapes or Combination Shapes.

At step 402, Deltas are calculated for the Morph Target Shapes and the Constraint Shapes. Instead of storing the absolute coordinates of Morph Target Shapes and Constraint Shapes, Deltas store the displacement vector relative to the Base Shape and any other shapes already accounted for in the nonlinear interpolation function.

At step 403, a lattice of points is defined/computed. The Morph Target Shape model can be considered as placing Morph Target Shapes (targets) at (at least) some of the vertices of an n-dimensional hypercube, with the origin being the Base Shape, and hypercube edges representing weights on the corresponding Morph Target Shapes. Combination Shapes are Lattice nodes placed at vertices the hypercube. Incremental Shapes are Lattice nodes along edges between the Base Shape (origin) and Morph Target Shape targets. Combination-Incremental Shapes are Lattice nodes at locations within the Lattice corresponding to the weightings on each constituent Morph Target Shape. Input Shapes need not necessarily form a full lattice. Additional Constraint Shapes may be generated to complete or at least augment the Lattice. Additional Constraint Shapes may be Incremental Shapes, Combination Shapes, and/or Combination-Incremental Shapes.

Figure 6:
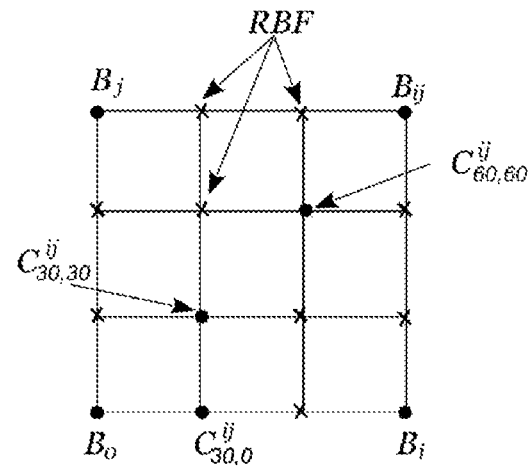
FIG. 6 shows an example of a 2D Lattice.

FIG. 6 shows an example of a 2D Lattice with Input Shapes (including Morph Target Shapes and Constraint Shapes) shown as dots, and unknown points to be generated are labelled as cross marks. In other words, Additional Constraint Shapes that are generated are provided having weights as shown by the cross marks. Any suitable method may be used to generate the Additional Constraint Shapes, such as Radial Basis Function interpolation (RBF), or another meshless interpolation method. Meshless in this context means a regular mesh is not required for interpolation.

Partitioning into Lower Dimensional Subspaces

As high-dimensional interpolation may be computationally expensive, partitioning into lower-dimensional spaces may be performed to facilitate the interpolation. Partitioning into lower-dimensional spaces may facilitate the generation of Additional Constraint Shapes. Instead of applying interpolation between a d-dimensional hypercube, the hypercube is split into an array of grids. For example, each group of Constraint Shapes may be split into its incremental dimension, meaning the number of Morph Target Shapes that are being combined. For example, incremental dimensions include: $C_{w_i}^{i}$ has an incremental dimension: d of 1, $C_{w_iw_j}^{ij}$ has an incremental dimension of 2, and $C_{w_iw_jw_k}^{ijk}$ has an incremental dimension of 3 etc. Following this, each group according to its incremental dimension may be further split into sub-groups based on the number of Euclidean spaces of dimension d which can be formed. A full Lattice for each subgroup is built and missing function values in the obtained grid are computed using a suitable meshless interpolation method, such as RBF. As a result, an array of grids is associated with each incremental dimension.

Detailed Description of Generating an Interpolation Function According to One Embodiment In simple terms, interpolation can be done by considering each Shape type and improving interpolation precision. One example is described in detail below:

Interpolation Using Only Morph Target Shapes

Any number of Morph Target Shapes $B_k$ are blended in a linear manner using the formula:

$$f = B_0 + \sum_{k=1}^{k}(w_k \Delta B_k)$$

where $B_0$ represents the shape's vertices at resting geometry (the base shape), $\Delta B_k$ is a vector representing displacement of the kth basis shape with respect to the Base Shape ($\Delta B_k = B_k - B_0$).

Interpolation Using Combination Shapes

The Interpolation Function may interpolate between Combination Shapes using an approximated Taylor series expansion or any other suitable multivariate interpolation system, for example, multivariate Lagrange interpolation. In abstract terms, Morph Target Shapes can be considered to be the tangent space about a Base Shape of the n-dimensional Shape "manifold" embedded in a m-dimensional ambient space. A shape associated with nonzero weights $w_i = w_j = 1$ is denoted as $B_{ij}$ and shape with $0 < w_i < 1$, $0 < w_j < 1$ as $C_{w_iw_j}^{ij}$. A set of all Shapes S is divided into three non-overlapping subsets: Morph Target Shapes $B_i$, Combination Shapes $B_{ij\ldots k}$ and Incremental Shapes $C_{w_iw_j\ldots w_k}^{ij\ldots k}$. Taking Base Shape $B_0$ as the origin or reference shape, the Interpolation Function $f(w)$ is created such that $f(W)=S$, with W representing the set of all given interpolation weights.

Based on the Taylor expansion, the blendshape function $f(w)$ in the neighbourhood of point w=0) can be expanded into:

$$f(w) = f(0) + \sum_{i=1}^{N} \frac{\partial f(0)}{\partial w_i} w_i + \quad (1)$$

-continued $$\sum_{i,j=1}^{N} \frac{1}{2!} \frac{\partial^2 f(0)}{\partial w_i \partial w_j} w_i w_j + \sum_{i,j,k=1}^{N} \frac{1}{3!} \frac{\partial^3 f(0)}{\partial w_i \partial w_j \partial w_k} w_i w_j w_k + \ldots$$

or $$f(w) = f(0) + \sum_{i=1}^{N} \frac{\partial f(0)}{\partial w_i} w_i + \sum_{i=1}^{N} \frac{1}{2!} \frac{\partial^2 f(0)}{\partial w_i^2} w_i^2 + \sum_{1 \le i < j \le N} \frac{\partial^2 f(0)}{\partial w_i \partial w_j} w_i w_j + \sum_{i=1}^{N} \frac{1}{3!} \frac{\partial^3 f(0)}{\partial w_i^3} w_i^3 + \sum_{1 \le i < j \le N} \frac{1}{2!} \frac{\partial^3 f(0)}{\partial w_i^2 \partial w_j} w_i^2 w_j + \sum_{1 \le i < j < k \le N} \frac{\partial^3 f(0)}{\partial w_i \partial w_j \partial w_k} w_i w_j w_k + \ldots \quad (2)$$

Keeping particular terms in the expansion (2) produces approximations at different levels of precision. Interpolation can be done by considering each shape type consequently and improving interpolation precision. Given only Morph Target Shapes, then $$f(w) = f(0) + \sum_{i=1}^{N} \frac{\partial f(0)}{\partial w_i} w_i \quad (3)$$

and using finite differences with unit step size (i.e. $\Delta w_j = 1$) for derivatives:

$$f(0) = B_0, \quad (4)$$

$$\frac{\partial f(0)}{\partial w_i} = B_i - B_0, \rightarrow$$

$$f(w) = B_0 + \sum_{i=1}^{N} (B_i - B_0) w_i \quad (5)$$

Given Combination Shapes, $B_{ij \ldots k}$, the mixed partial derivatives can be kept in (2) with finite differences approximations:

$$\frac{\partial^2 f(0)}{\partial w_i \partial w_j} = B_{ij} - B_i - B_j + B_0, \quad (6)$$

$$\frac{\partial^3 f(0)}{\partial w_i \partial w_j \partial w_k} = B_{ijk} - B_{ij} - B_{ik} - B_{jk} + B_i + B_j + B_k - B_0$$

The high order derivatives $$\frac{\partial^m f(O)}{\partial w_i^m} = 0$$

produce a linear (with respect to individual coordinate) model of the form:

$$f(w) = B_0 + \sum_{i=1}^{N} (B_i - B_0) w_i + \sum_{1 \le i < j \le N_2} (B_{ij} - B_i - B_j + B_0) w_i w_j \quad (7)$$

$$+ \sum_{1 \le i < j < k \le N_3} (B_{ijk} - B_{ij} - B_{ik} - B_{jk} + B_i + B_j + B_k - B_0) w_i w_j w_k + \ldots$$

or in compact form:

$$f(w) = B_0 + \Sigma_{i=1}^{N} \Delta B_i w_i + \Sigma_{1 \le i < j \le N_2} \Delta B_{ij} w_i w_j + \Sigma_{1 \le i < j < k \le N_3} \Delta B_{ijk} w_i w_j w_k + \quad (8)$$

Additional terms are present in (8) only if corresponding Combination Shapes are given. Coefficients $\Delta B_{ijk}$ can be obtained by constructing an interpolation function so that it takes given values (Combination Shape values) at the interpolation points, such that:

$$f(0,0, \ldots, w_i=1, w_j=1, w_k=1, 0, \ldots) = B_{ijk} \quad (9)$$

As a result $$\Delta B_i = B_i - B_0 \quad (10)$$

$$\Delta B_{ij} = B_{ij} - \left( B_0 + \sum_{p=\{i,j\}} \Delta B_p \right)$$

$$\Delta B_{ijk} = B_{ijk} - \left( B_0 + \sum_{p=\{i,j,k\}} \Delta B_p + \sum_{p,q=\{i,j,k\}} \Delta B_{pq} \right)$$

Interpolation Using Incremental Shapes

The interpolation function may interpolate between Incremental Shapes using any suitable regular or irregular grid interpolation system, including, but not limited to tensor spline interpolation, Triangulated Polynomial Interpolation Network, or Thin Plate Spline interpolation. The interpolation technique usable here may depend on the completeness of the hypercube. If the lattice is a full lattice, tensor Spline interpolation may be preferred. If the lattice is an incomplete/partial lattice, Triangulated Polynomial Interpolation Network, or Thin Plate Spline interpolation may be used. In another embodiment, cubic Hermite splines may be used to incorporate Incremental Shapes. The Hermite polynomials' parameters may be estimated automatically from the nearby nodes together with constraints to minimize interpolation overshoot, avoiding the need to set up the nonlinear incremental network.

The following example of interpolating using Incremental Shapes uses tensor spline interpolation. The model (8) is quasi linear. Nonlinearity is added when incremental shapes are considered. Incremental Shapes $C_{w_i w_j w_k}^{ijk}$, are incorporated using modifier terms that are non-zero when corresponding Incremental Shapes are present.

$$f(w) = B_0 + \Sigma_{i=1}^{N} \Delta B_i w_i + \Sigma_{1 \le i \le M_1} h_i(\Delta C_{w_i}^i, w_i) + \Sigma_{1 \le i \le N} \Delta B_{ij} w_i w_j + \Sigma_{1 \le i < j \le M_2} h_{ij}(\Delta C_{w_i w_j}^{ij}, w_i, w_j) + \Sigma_{1 \le i < j < k \le N} \Delta B_{ijk} w_i w_j w_k + \Sigma_{1 \le i < j < k \le M_3} h_{ijk} (\Delta C_{w_i w_j w_k}^{ijk}, w_i, w_j, w_k) + \ldots \quad (11)$$

Here the functions $h_{ijk}(\Delta C_{w_i w_j w_k}^{ijk}, w_i, w_j, w_k)$ are devised such that:

$$h_{ijk}(\Delta C_{w_i w_j w_k}^{ijk}, 0, 0, 0) = 0 \quad (12)$$

$$h_{ijk}(\Delta C_{w_i w_j w_k}^{ijk}, 1, 1, 1) = 0$$

$$h_{ijk}(\Delta C_{w_i w_j w_k}^{ijk}, w_i, w_j, w_k) = \Delta C_{w_i w_j w_k}^{ijk}$$

The Functions h interpolate in between incremental shapes points on top of the interpolation performed using only combination points, wherein tensor spline interpolation is used to implement functions h. Interpolation representation (11) takes exactly given shape values at interpolation points and approximates nonlinearly in points to be interpolated. Function h is defined using tensor product spline method in M dimensional space. Assuming a hypercube with $n = 2^M$ vertices $\{V_m\}$, $m = 1, \ldots, n$ and corresponding function values $\{F_m\}$, $m = 1, \ldots, n$. All points $V_m$ have two distinct values per each dimension, $(v_i^a, v_i^b)$, so for any point x within this hypercube we have $x_i \in [v_i^a, v_i^b]$. Then, for $x_i \in [v_i^a, v_i^b]$ the line segment:

$$h(x) = y^a \left(1 - \frac{x_i - v_i^a}{v_i^b - v_i^a}\right) + y^b \frac{x_i - v_i^a}{v_i^b - v_i^a} \quad (15)$$

connects the two values $y^a$ and $y^b$, which, in turn, also functions of $x_j$. Now, functions $y^a(x_j)$ and $y^b(x_j)$ are defined for $x_j$ in the interval $[v_j^a, v_j^b]$ $$y^a(x_j) = y^{aa}\left(1 - \frac{x_j - v_j^a}{v_j^b - v_j^a}\right) + y^{ab} \frac{x_j - v_j^a}{v_j^b - v_j^a} \quad (16)$$

$$y^b(x_j) = y^{ba}\left(1 - \frac{x_j - v_j^a}{v_j^b - v_j^a}\right) + y^{bb} \frac{x_j - v_j^a}{v_j^b - v_j^a}$$

As a result a recurrent sequence is obtained to compute function h which performs interpolation within a hypercube. Taking a set of gridded data of incremental shapes $\{(v_i, v_j, v_k), \Delta C_{v_i v_j v_k}^{ijk}\}$ and given point to be interpolated $(x_i, x_j, x_k)$ interpolation is performed interpolation using (15), (16) after the corresponding hypercube to which the point $(x_i, x_j, x_k)$ belongs is found.

According to the described embodiment, the interpolation algorithm may include two stages:

Precomputing Stage

Separate all shapes into three subsets: basis, combination and incremental shapes Compute $\Delta B$ and $\Delta C$ from (10) and (14).

Split $\Delta C$ into groups based on incremental dimension: $\Delta C_{w_i}^i$, $\Delta C_{w_i w_j}^{ij}$, $\Delta C_{w_i w_j w_k}^{ijk}$, Each group of $\Delta C$ having incremental dimension of d is split into sub-groups based on number of Euclidean spaces of dimension d which can e formed. A full lattice for each subgroup is built and missing function values in obtained grid are computed from RBF method. As a result, an array of grids $g_{ijk}$ is associated with each group $\Delta C_{w_i w_j w_k}^{ijk}$ . . . .

Performing interpolation stage.

Given a point $w=(w_1, w_2, \ldots, w_N)$ to be interpolated, compute $f(w)$ from (8).

Iterate over all grids $g_{ijk}$ find a grid cell to which the point $(w_i, w_j, w_k, \ldots)$ belongs and calculate functions $k_{ijk}$ from (15)-(16).

The final result is the sum of $f(w)$ from (8) and all values of $h_{ijk}$

Advantages

Performing computer graphics animation through combining constraint shapes in a nonlinear fashion prevents the generation of undesirable shapes by providing realistic constraint shapes of a subject. The Interpolator improves blending between Morph Target Shapes. Shapes which are combinations and/or weightings of morph target shapes are reproducible as they are input into the model as constraint shapes. The constraint shapes are accounted in the interpolation model through a non-linear interpolation function. Thus the Interpolator works in a predictable and intuitive manner.

The time, labour and resources required to develop a realistic model is reduced, as digital modelers do not need to create as many examples as would be the case under traditional example-based methods, as non-linear deformation is automatically accounted for in the Interpolator. The Interpolator is easier to use because the dimensionality of what an animator needs to work with is reduced. Constraint Shapes are not additional dimensions but rather accounted for in the base Morph Target Shapes as nonlinear terms. For example, in a slider-based animation system, practically speaking, it is easier for an animator to control 60 sliders rather than 210+ sliders. Combination shapes and/or incremental are no longer additional shapes which need to be manually controlled or specifically accounted for. The controls are smoother and easier to use.

Fast and real-time interpolation can be achieved even on low specification machines, because real-time interpolation is a linear process using the Interpolator. The number of Morph Target Shapes, and number of components to be constrained may affect the performance of the Interpolator, however it mainly affects pre-computation time as the cost of real-time interpolation is fixed.

Textures may be blended in an analogous manner. Rather than blending vertex positions, colour and transparency channels may be blended (e.g. R,G,B, A). Similarly, incremental and combination texture examples would be created and the channels blended according to the interpolation method described herein.

Morph Target Shape Mapper

Figure 13:
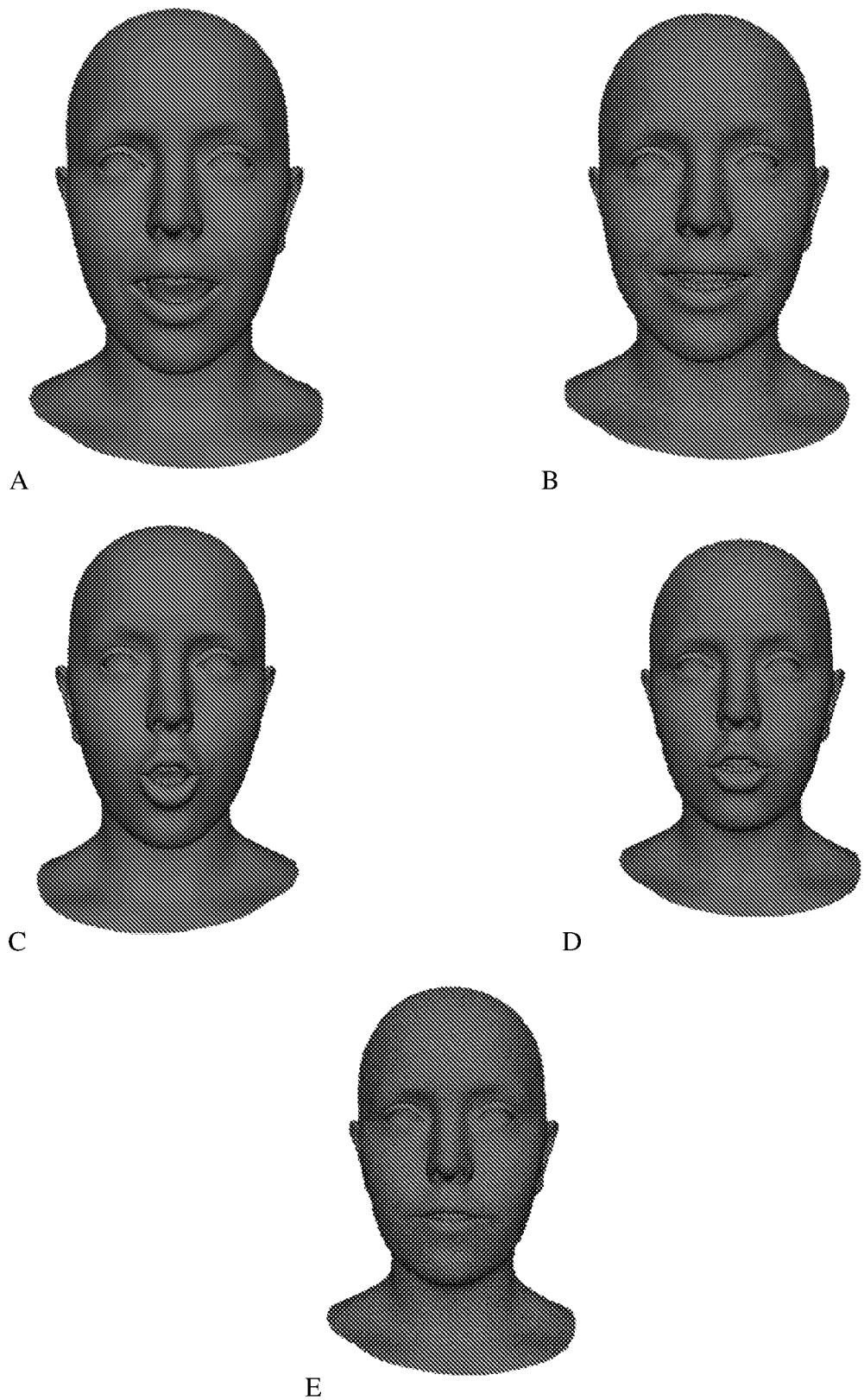
FIG. 13 shows visemes.

Morph Target Shapes may be Component Shapes, sometimes referred to "basis shapes", in other words, shapes representing a unique fundamental motion from a resting state, and may be thought of a basic building blocks for creating further shapes. In other words, they are elementary deformations of shapes. FACS Action Units are good examples of Component Shapes or "basis shapes" as complex facial expressions can be interpreted as a mixture or combination of AUs. A facial animation set up allows an animator to build a complex facial expression by mixing AUs to produce a natural deformation. Visemes may or may not be considered as Component Shapes ("basis shapes"). FIG. 13 shows examples of visemes, including the viseme "AI" A, viseme "I" B, viseme "O" C, Viseme "TS" D and viseme "V" E.

A Mapper addresses the problem of figuring out which weighted combination of Component Shapes reflect a given shape when this is not known a priori, such as when the user has created a desirable example shape in terms of collection of geometrical points without using a Morph Target Shape interpolation method. In other words, the Mapper calculates a combination of Component Shapes which estimates the given shape with unknown weightings (Unsolved Shape). For example, an animator may wish to use a scanned 3D model of a person showing a laughing expression as a Morph Target Shape, however it may be difficult to manually map the expression onto corresponding Component Shapes and/or Component Shape weights. In addition, the mapping results may become outdated when the geometry of one of its Component Shapes is modified. Therefore, animator mapped sequences are prone to error in a constantly evolving development environment.

A Mapper allows estimating these weights through mapping the example shape vertices onto Component Shape vertices. In one embodiment, the Mapper estimates the underlying Component Shapes and respective weightings of an Unsolved Shape by using a least square problem with penalty terms depending on the number of Morph Target Shapes known to be part of the Unsolved Shape (or the number of particular shapes to be included into the result).

$$\|T - f(w)\|^2 + k \sum_i \|\lambda_i w_i\|$$

subject to a Solution Boundary, $0 \le w_i \le 1$, wherein T is a target shape, $f(w)$ is the shape combination model and $\lambda_i$ are the penalties. The Mapper receives as input a named shapes data set and vertices of the Unsolved Shape to be estimated.

Figure 16:
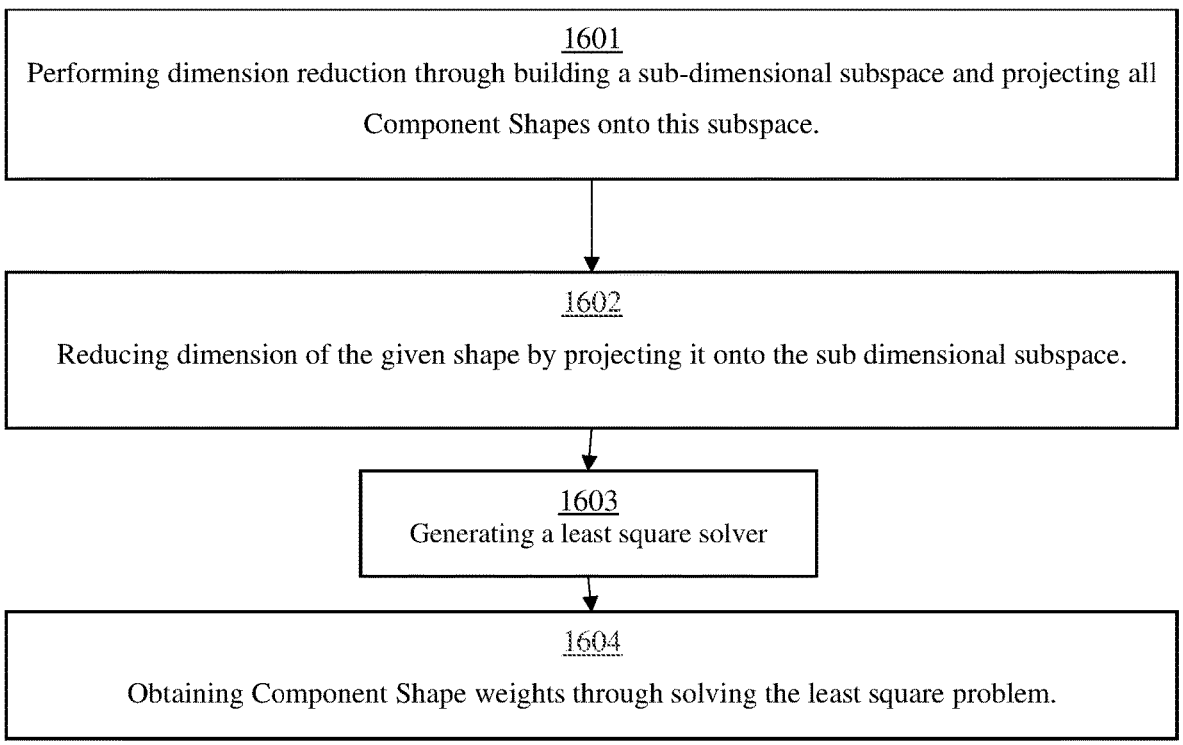
FIG. 16 shows a flow diagram of a method of estimating Component Shape weight.

FIG. 16 shows a flow diagram of one method of estimating values for user specified Component Shape weights corresponding to an Unsolved Shape. At step 1601, dimension reduction is performed through building a dimensional space and projecting all Component Shapes onto this subspace. At step 1602, the dimensionality of the Unsolved Shape is reduced by projecting the Unsolved Shape onto the sub dimensional space. At step 1603, a least square solver is generated. The least square solver may have the form:

$$\min \left\| \sum_{k=1}^{n} w_k \Delta T_k - \Delta F \right\| + \mu \sum_{k=1}^{n} \|\lambda_k w_k\|,$$

where $\Delta T_k$ and $\Delta F$ are the dimensionally reduced basis shapes and example shape displacements respectively, coefficients $\lambda_i$ reflects penalizing of the user specified Component Shape weights. At step 1604, Component Shape weights are generated through solving the least square problem.

Suggesting Components Shapes

A user can make suggestion on the Component Shapes for the Mapper to map onto. In order to allow this, the penalty coefficients of the suggested components $\lambda_i$ are reduced, which then increases the probability that these suggested Component Shapes are used during the mapping process. In addition, the Solution Boundary is modified to $0 \leq w_i \leq 1$ for the suggested Component Shapes.

In another embodiment, both the Component Shapes and their associating weights can be suggested and enforced. In this case, the exact value of weights are defined for the suggested Component Shapes in the least square solver.

Dimension Reduction

Since the shape mesh may contain a large number of vertices, calculation of the least square problem may be inefficient and time consuming. Therefore the dimensionality of each shape may be reduced before solving the least square problem. Dimension reduction may be performed through singular value decomposition and projecting data on a lower dimension space having basis of leading singular vectors, or any other suitable method. Numerical simulation experiments show that taking six leading singular vectors can obtain reliable weight estimation for facial models, however any other suitable number of leading singular vectors may be used.

A naming convention for Shapes may be used to facilitate animation. For example, two underscores "_ _" may be used to denote an unknown shape name from the interpolation shapes:

EXsmile__AU06_AU12_ AU26_25 is a smile shape with a predefined combination node and known weight for AU26 (AU06 and AU12 are also suggested, but their weights need to be estimated).

PhBut__ is a phoneme 'but' shape where the combination node needs to be estimated. Variants to PhBut__ may be the shouting phoneme (PHbutshout), or the silent phoneme (PHbutsilent): and each variant is mapped independently onto the FACS space through the Mapper.

Animation System

An Animation Framework 14 may be provided to enable the use of Complex Shapes including two or more Combination Shapes as animation targets or Control Shapes. Complex Shapes such as complex expressions comprising a plurality of underlying Component Shapes may be difficult and time-consuming to animate as an animator would need to set weightings for several Component Shapes individually. It is desirable to allow a single control to animate a Complex Shape. However, merely interpolating between Complex Shape and a Base Shape may not look realistic as components of the complex shape may not deform in a linear manner, and combinations of Component Shapes may also interpolate in a manner that is not equivalent to the sum of their parts. Another problem is how to allow animation of a distinctive shape whereby underlying component shapes are not known and may be difficult to ascertain manually. For example in the context of facial animation, some actors have unique complex facial expressions which even experienced animators may struggle to map to underlying component movements (such as FACS AUs).

The Animation Framework 14 maps Complex Shapes (Complex Morph Target Shapes) into their constituent Component Shapes to form a set of target Component Shapes. If constituent Component Shapes and/or weightings are not known, then a Mapper figures out the underlying Component Shapes and their respective weightings. An Interpolator interpolates between the weighted underlying target Component Shapes.

Detailed Description & Embodiments

The Morph Target Shape Animation Framework 14 is designed to incorporate the nonlinear Morph Target Shape interpolation system and the Morph Target Shape Mapper into one system while adding flexibility for a user. The end user is able to manipulate and create shapes without splitting them into Component Shapes (basis shapes) and example shapes but thinking about them as animations. Animation shapes can be controlled through the animation weights and the animation system is capable of mapping all weights onto Component Shape weights and performing Morph Target Shape interpolation.

Figure 17:
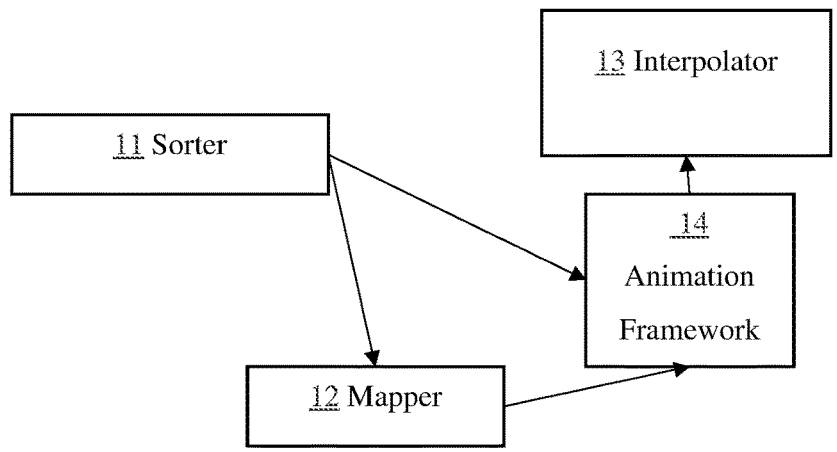
FIG. 17 shows an animation flow.

FIG. 17 shows a schematic flow diagram of an animation method. A Sorter 11 receives a plurality of Control Shapes and processes each Control Shape. For example, the Sorter 11 receives the shapes {AU12, AU26, AU12_AU26, Smile__ AU12_AU26}. If a Control Shape is a Complex Shape for which its underlying Component Shapes are not known, the Control Shape is input into a Mapper 12 which outputs the underlying Component Shapes and their respective weightings. The results of this is then passed to an Animation Framework 14 which maps user-provided control weights to Component Shape weights. The Interpolator 13 interpolates between Control Shapes by interpolating between each of the Control Shapes' underlying Component Shapes.

Weights are provided for Control Shapes which are mapped through the matrix onto Component Shape weights, and then the Interpolator uses the Component Shape weights as input, to output an interpolated shape. A Control Shape may be a Component Shape, a Complex Shape or a combination of Component Shapes and Complex Shapes. Control Shapes may include metadata describing any Component Shapes which are known to be components of the Control Shapes.

Some examples are as follows:

AU12: A Component Shape

AU26: A Component Shape

AU12_AU26: A Complex Shape comprising two Component Shapes: The Component Shapes present are already known and evident from the naming convention.

Smile__AU12__AU26.05: A Control Shape in which components of the Control Shape are known to be AU12__AU26.05. Therefore this Control Shape need not be passed to the Mapper and can be passed directly to the Animation Framework, which passes the underlying Component Shapes and weights to the Interpolator.

Laugh: A Control Shape in which components of the Control Shape are not know. The Control Shape can be passed to the Mapper which calculates the constituent Component Shapes and their weightings.

Happy__Laugh_Smile: A Control Shape comprising two other Control Shapes (which are Complex Shapes)

Figure 18:
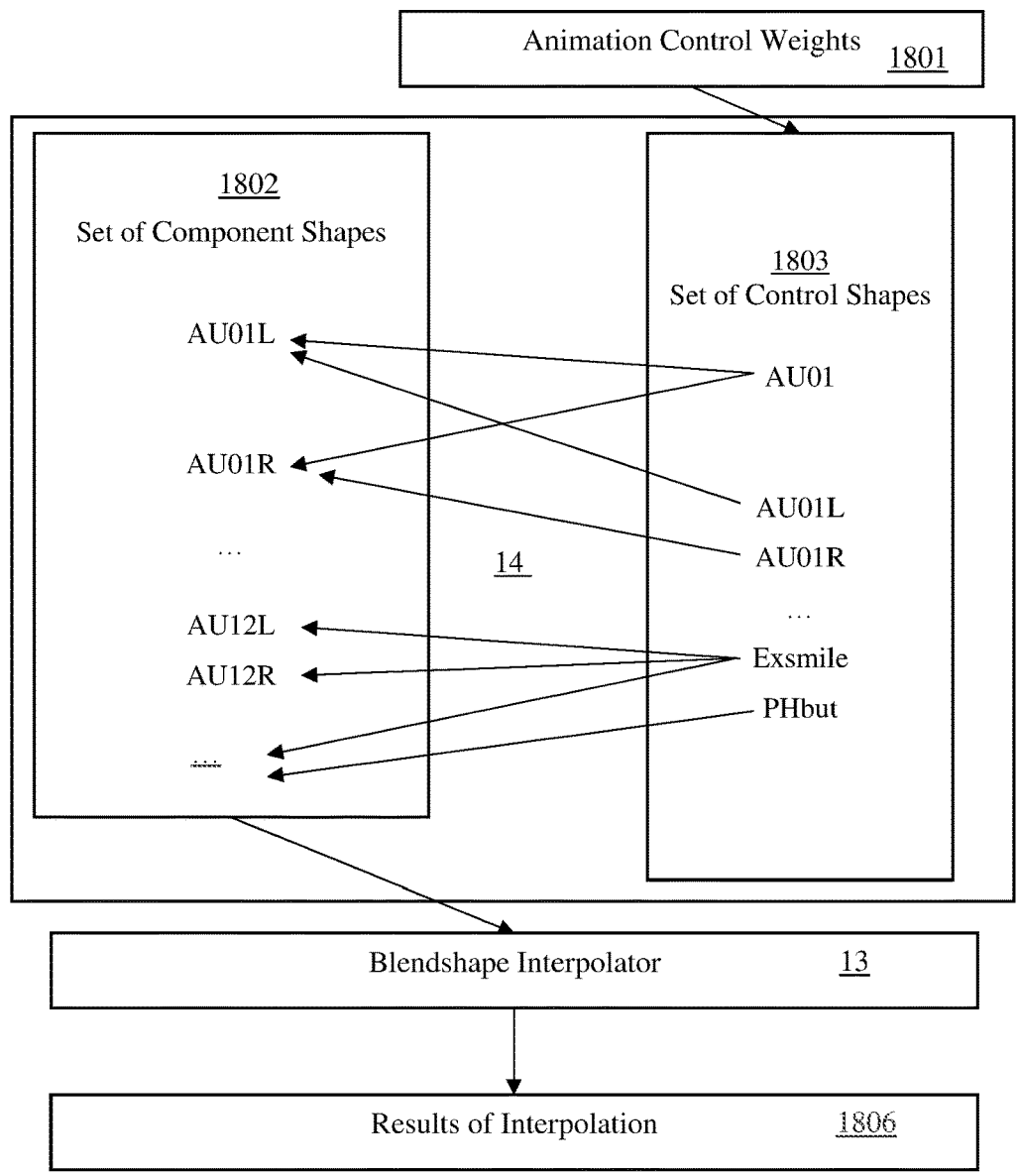
FIG. 18 shows an animation system.

FIG. 18 shows a schematic representation of animating using the Animation Framework 14. Animation control weights 1801 for Control Shapes are provided to the Animation Framework 14. The Animation Framework 14 provides a mapping between Control Shapes 1803 and underlying Component Shapes 1802. An animator may have the option to animate a Complex Shape either by providing weights on its Component Shapes as (using several Component Shapes as Control Shapes), or use a corresponding predefined Complex Shape as the Control Shape. As shown in FIG. 18, a user may specify a weighting of 1 on each of AU01L and AU01R or Control Shapes, or a weighting of 1 on AU01 (which is internally mapped to AU01L and AU01R via the Animation Framework 14), to create an equivalent resulting shape. An incremental shape AU01_50 would be internally mapped to AU12L_50 and AU01R_50 and the Interpolator would interpolate a combination of AU12L_50 and AU01R_50. Thus, even though AU01 provides convenience to an animator as they only need to toggle one slider, AU01 does not add computational complexity to the Interpolator as AU01 is not added as an another Component Shape/Morph Target Shape. Component Shapes are passed to the Interpolator 13 which interpolates between the Component Shapes using the mapped weightings, and the results of the interpolation 1806 are used for animation.

Complex Shapes

A Complex Shape is comprised of a plurality of Component Shapes. For example, Complex Shapes may represent emotions which comprise a plurality of AUs, as shown in the following table:

| Emotion | Action Units |
| --- | --- |
| Happiness | 6 + 12 |
| Sadness | 1 + 4 + 15 |
| Surprise | 1 + 2 + 5B + 26 |
| Fear | 1 + 2 + 4 + 5 + 7 + 20 + 26 |

A Component Shape is a subcategory of Morph Target Shape wherein its weights form basis vectors in the space of input values of an interpolation function. Component Shapes represent a unique fundamental motion from a resting state. FACS AUs are good examples of Component Shapes as complex facial expressions can be interpreted as a mixture or combination of AUs. A facial animation set up allows an animator to build a complex facial expression by mixing AUs to produce a natural deformation. Visemes can be considered as fundamental Component Shapes for speech, however they themselves are composed of AUs: thus it can be seen that categorization as a Component Shape or "basis shape" depends on the degree of abstraction.

Figure 11:
FIG. 11 show left and right Morph Target Shapes of a bilaterally symmetrical facial expression.
Figure 11:
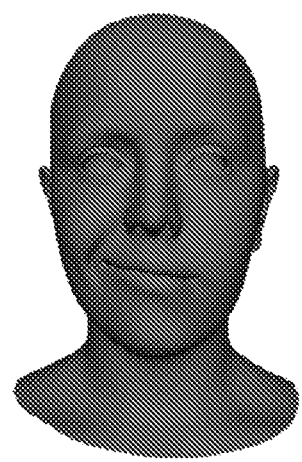
Figure 12:
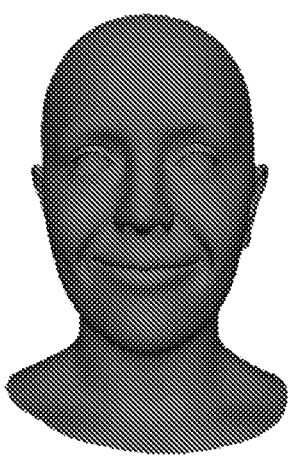
FIG. 12 shows Constraint Shapes which are Combination Shapes.
Figure 12:
Figure 12:
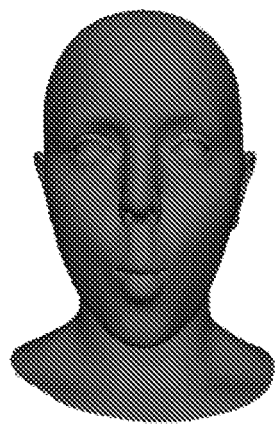
Figure 12:
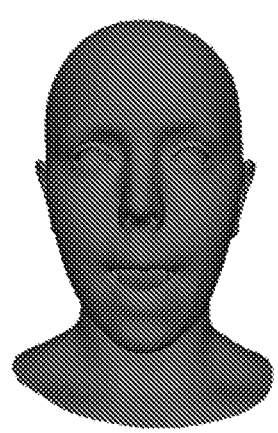

Bilateral shapes may be not considered as Component Shapes but rather a Complex Shape which is a combination of Component Shapes. FIG. 11 show left and right Morph Target Shapes of a bilaterally symmetrical facial expression: "left-lip-corner-puller" A and "right-lip-corner-puller" B, corresponding to bilaterally symmetrical FACS AU12. The Complex Shape (AU12_AU12L_AU12R) can be used as a Control Shape for an expression in which both lip corners are pulled (a smile). The Animation Framework 14 maps the Control Shape into its Component Shapes AU12L and AU01R, and the Interpolator 13 interpolates the Component Shapes AU12L and AU01R to create the smile.

Advantages

The Animation Framework allows a single control to animate a Complex Shape in a realistic manner, taking into account the intricacies of interactions and interpolations of underlying Component Shapes. Complex Shapes such as visemes, emotions and other facial expressions can be defined as animation controls, and therefore do not increase the dimensionality of the interpolation system. An animator can animate using a Complex Shape even if the animator cannot readily ascertain the Shape's underlying Component Shapes.

REFERENCE SIGNS LIST

1 Shape
2 Morph Target Shape
3 Base Shape
4 Constraint Shape
5 Incremental Shape
6 Combination Shape
7 Combination-Incremental Shape
8 Modifier
9 Component Shape
10 Complex Shape
11 Sorter
12 Mapper
13 Interpolator
14 Animation Framework
15 Control Shape
16 Unsolved Shape
17 Input
18 Additional
19 Lattice
20 Morph Target Animation Model
21 Interpolation Function

INTERPRETATION

The methods and systems described may be utilised on any suitable electronic computing system. According to the embodiments described below, an electronic computing system utilises the methodology of the invention using various modules and engines.

The electronic computing system may include at least one processor, one or more memory devices or an interface for connection to one or more memory devices, input and output interfaces for connection to external devices in order to enable the system to receive and operate upon instructions from one or more users or external systems, a data bus for internal and external communications between the various components, and a suitable power supply. Further, the electronic computing system may include one or more communication devices (wired or wireless) for communicating with external and internal devices, and one or more input/output devices, such as a display, pointing device, keyboard or printing device.

The processor is arranged to perform the steps of a program stored as program instructions within the memory device. The program instructions enable the various methods of performing the invention as described herein to be performed. The program instructions, may be developed or implemented using any suitable software programming language and toolkit, such as, for example, a C-based language and compiler. Further, the program instructions may be stored in any suitable manner such that they can be transferred to the memory device or read by the processor, such as, for example, being stored on a computer readable medium. The computer readable medium may be any suitable medium for tangibly storing the program instructions, such as, for example, solid state memory, magnetic tape, a compact disc (CD-ROM or CD-R/W), memory card, flash memory, optical disc, magnetic disc or any other suitable computer readable medium.

The electronic computing system is arranged to be in communication with data storage systems or devices (for example, external data storage systems or devices) in order to retrieve the relevant data.

It will be understood that the system herein described includes one or more elements that are arranged to perform the various functions and methods as described herein. The embodiments herein described are aimed at providing the reader with examples of how various modules and/or engines that make up the elements of the system may be interconnected to enable the functions to be implemented. Further, the embodiments of the description explain, in system related detail, how the steps of the herein described method may be performed. The conceptual diagrams are provided to indicate to the reader how the various data elements are processed at different stages by the various different modules and/or engines.

It will be understood that the arrangement and construction of the modules or engines may be adapted accordingly depending on system and user requirements so that various functions may be performed by different modules or engines to those described herein, and that certain modules or engines may be combined into single modules or engines.

The modules and/or engines described may be implemented and provided with instructions using any suitable form of technology. For example, the modules or engines may be implemented or created using any suitable software code written in any suitable language, where the code is then compiled to produce an executable program that may be run on any suitable computing system. Alternatively, or in conjunction with the executable program, the modules or engines may be implemented using, any suitable mixture of hardware, firmware and software. For example, portions of the modules may be implemented using an application specific integrated circuit (ASIC), a system-on-a-chip (SoC), field programmable gate arrays (FPGA) or any other suitable adaptable or programmable processing device.

The methods described herein may be implemented using a general-purpose computing system specifically programmed to perform the described steps. Alternatively, the methods described herein may be implemented using a specific electronic computer system such as a data sorting and visualisation computer, a database query computer, a graphical analysis computer, a data analysis computer, a manufacturing data analysis computer, a business intelligence computer, an artificial intelligence computer system etc., where the computer has been specifically adapted to perform the described steps on specific data captured from an environment associated with a particular field.

The invention claimed is:

1. A method for generating a weighted interpolation between a plurality n of morph target shapes $B_1 \ldots B_n$ elative to a base shape $B_0$ including the steps of:
 receiving a set of weights W, including for each morph target shape $B_k$ of the morph target shapes $B_1 \ldots B_n$, a weight $w_k$ to be applied to that morph target shape $B_k$;
 receiving a plurality m of constraint shapes $C_1 \ldots C_m$, each constraint shape associated with non-zero weights (associated weights) on one or more of the morph target shapes $B_1 \ldots B_n$ (associated shapes);
 generating a continuous multivariate interpolation function configured to reproduce each morph target shape and each constraint shape when a respective morph target shape or a constraint shape's associated weights on associated shapes are provided as arguments to the interpolation function; and using the weights W to be applied to morph target shapes as arguments of the interpolation function to generate the weighted interpolation, wherein the interpolation function has the form:

$$f(W) = B_0 + \Sigma_{k=1}^{n} (w_k \Delta B_k) + \Sigma_{i=1}^{m} (\beta_i \Delta C_i)$$

wherein $\Delta B_k$ represents a modified morph target shape; $\Delta C_i$ represents a modified constraint shape; and $\beta_i$ represents a modifier applied to each constraint shape $C_i$;
wherein the interpolation function is configured to make the interpolation function hold for all constraint shapes $C_1 \ldots C_m$.

2. The method of claim 1 wherein the interpolation function represents non-linear relationships between weights W and morph target shapes.

3. The method of claim 2 wherein the multivariate interpolation function is a high dimensional model representation.

4. The method of claim 3 wherein constraint shapes include combination shapes corresponding to a combination between the two or more morph target shapes with unitary weights and wherein the modifiers applied to combination shapes are a function of the associated weights for each combination shape.

5. The method of claim 3 wherein constraint shapes include at least one incremental shape corresponding to a partial weighting of one or more of the morph target shapes.

6. The method of claim 2 wherein the interpolation function is linearized as a linear-weighted summation of modifiers applied to morph target shapes and constraint shapes.

7. The method of claim 6 wherein the linear-weighted summation is based on an approximated Taylor series expansion.

8. The method of claim 7 wherein interpolation precision is further improved by interpolating between incremental shapes using a mesh or meshless interpolation system.

9. The method of claim 8 wherein constraint shapes include combination shapes corresponding to a combination between the two or more morph target shapes with unitary weights and wherein the modifiers applied to combination shapes are a function of the associated weights for each combination shape.

10. The method of claim 8 wherein constraint shapes include at least one incremental shape corresponding to a partial weighting of one or more of the morph target shapes.

11. The method of claim 7 wherein constraint shapes include combination shapes corresponding to a combination between the two or more morph target shapes with unitary weights and wherein the modifiers applied to combination shapes are a function of the associated weights for each combination shape.

12. The method of claim 7 wherein constraint shapes include at least one incremental shape corresponding to a partial weighting of one or more of the morph target shapes.

13. The method of claim 6 wherein constraint shapes include combination shapes corresponding to a combination between the two or more morph target shapes with unitary weights and wherein the modifiers applied to combination shapes are a function of the associated weights for each combination shape.

14. The method of claim 6 wherein constraint shapes include at least one incremental shape corresponding to a partial weighting of one or more of the morph target shapes.

15. The method of claim 2 wherein constraint shapes include combination shapes corresponding to a combination between the two or more morph target shapes with unitary weights and wherein the modifiers applied to combination shapes are a function of the associated weights for each combination shape.

16. The method of claim 2 wherein constraint shapes include at least one incremental shape corresponding to a partial weighting of one or more of the morph target shapes.

17. The method of claim 1 wherein constraint shapes include combination shapes corresponding to a combination between the two or more morph target shapes with unitary weights.

18. The method of claim 17 wherein the modifiers applied to combination shapes are a function of the associated weights for each combination shape.

19. The method of claim 18 wherein the function of the associated weights is the product of the associated weights.

20. The method of claim 18 wherein the function of the associated weights is the geometric mean or harmonic mean of the associated weights.

21. The method of claim 1 wherein constraint shapes include at least one incremental shape corresponding to a partial weighting of one or more of the morph target shapes.

\* \* \* \* \*